July 4, 1944.  W. R. REYNOLDS  2,352,735
LOGOMETER
Filed March 13, 1941
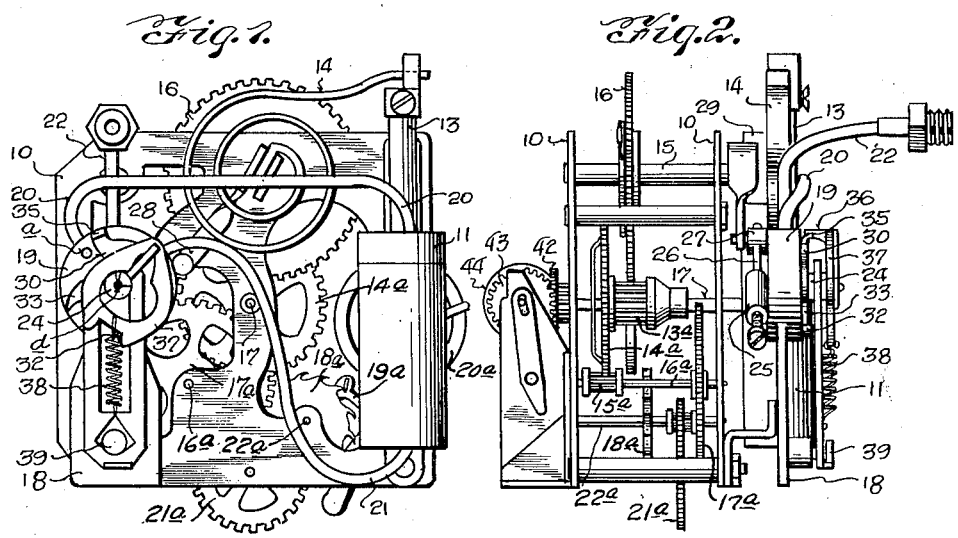
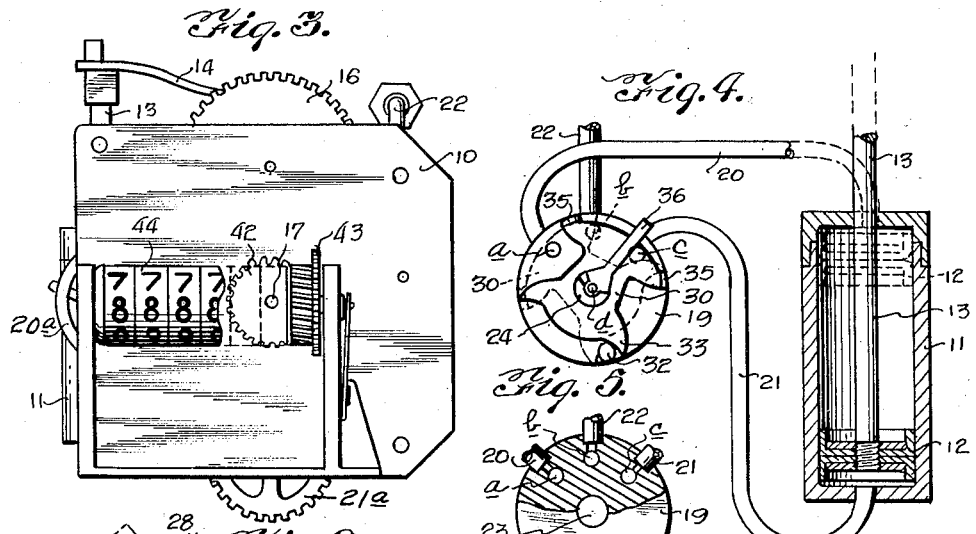
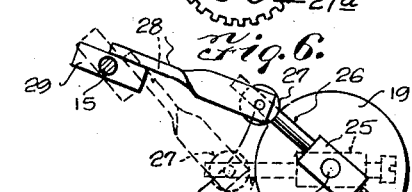
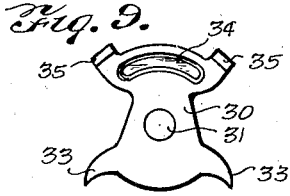
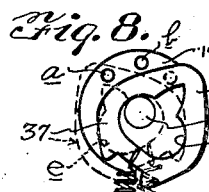
WILLIAM R. REYNOLDS
INVENTOR.
BY
ATTORNEY Patented July 4, 1944

2,352,735

UNITED STATES PATENT OFFICE 2,352,735

LOGOMETER

William R. Reynolds, Dallas, Tex., assignor of one-half to H. L. Williford, Dallas, Tex.

Application March 13, 1941, Serial No. 383,186

5 Claims. (Cl. 161—15)

This invention relates to internal combustion engines and it has particular reference to an instrument for registering and visibly indicating operative periods of an internal combustion engine.

The principal object of the invention is to provide an instrument for measuring the hours and fractions thereof consumed by operators of engines, such as students in airplane training, airplane pilots, rent car operators and in many other cases where a log is to be maintained as to work performed by the operator, the engine, or both.

Another object of the invention is to provide for accurate timing of the operative periods of an engine by employing with a clock work mechanism, an operating medium therefor in the nature of vacuum originating in the intake manifold of the engine, thereby reducing or eliminating entirely the errors of calculation to which spring, electrical or pressure actuated clocks are subject. During operating periods of an internal combustion engine, a partial vacuum is at all times present in the intake manifold and ceases instantly to exist when the ignition is turned off. In utilizing the vacuum thus created to operate the invention, there will be no interim, either before or after the engine is set into operation, that will escape integration on the instrument.

Another object of the invention resides in its ready adaptability to any type of internal combustion engine and the fact that its presence will not at any time interfere with the performance of the engine or its parts.

With the foregoing objects as paramount, the invention has particular reference to its salient features of construction and arrangement of parts which will become manifest as the description proceeds, taken in connection with the accompanying drawing, wherein:

Figure 1 is a rear elevational view of an instrument constructed according to the present invention with the case removed.

Figure 2 is a side view thereof.

Figure 3 is a front elevational view.

Figure 4 is a detail view of the vacuum-actuated clock control valve.

Figure 5 is a detail view, partly in section, showing the valve manifold, vacuum cylinder and piston.

Figure 6 is a detail view of the mechanism for translating vacuum power into leverage to operate the clock.

Figure 7 is a fragmentary detail view of the clock main wheel and ratchet control.

Figure 8 is a detail view of the valve trip, and

Figure 9 is a detail view of the valve port interchanger.

Figure 10 is a perspective view of the interchanger per se.

Continuing with a more detailed description of the drawing, reference is primarily made to Figure 1 wherein numeral 10 designates the frame of a clock mechanism which is of more or less conventional construction except for the omission of a main spring. As stated previously, it is the intent of the invention to substitute the driving means to be hereinafter described for the conventional spring or electrically operated clock motor in order that operation of the clock and consequently the time register will be wholly and strictly dependent upon the internal combustion engine whose operating periods it measures.

Attached to the frame 10 is a cylinder 11 having therein a piston 12 (Figure 4) and a piston rod 13. The free end of the rod 13 is slotted to receive the end of a resilient member which, in the present case, consists of a spirally wound spring 14. This spring is not highly resilient, but such resiliency as it inherently possesses provides for the building up in the spring, by arcuate motion imparted to its free end, sufficient energy for transmission to the clock mechanism to operate the latter for short periods, but such energy will not be returned to the piston on its return stroke before it is utilized to actuate the clock mechanism. The central end of the spring 14 is fixed to a shaft 15 which is conventionally the main spring shaft and which transmits, by the rotative force applied to the main wheel 16 thereon, operating power to the train of gears cooperatively related throughout the assembly, to ultimately rotate the center shaft 17 at a predetermined rate of speed.

Mounted also on the frame 10 opposite the cylinder 11 by means of a bracket 18 is a control valve comprised of a solid circular body or manifold 19, in one side of which but not entirely therethrough is drilled three equidistantly spaced holes $a$, $b$ and $c$ (Figures 4 and 5). Communicating with aperture $a$ is a tube 20 which extends across to the cylinder 11 and enters the top thereof. A similar tube 21 communicates with aperture $c$ and enters the bottom of the cylinder 11. Still a third tube 22 connects with the central aperture $b$ and extends to the intake manifold of the engine (not shown). It is apparent that through this arrangement, a vacuum will be immediately established in the tube 22 when the engine is set to operating and that when alternate interconnection is made between tubes a and b and b and c, the result will be an upward and downward movement respectively of the piston 12 in the cylinder 11, for the purpose to be presently made clear.

The manifold element 19 has an opening 23 in the center thereof to receive a stub shaft 24. The inner end of this shaft has rigidly mounted thereon a cross head 25 from one end of which projects a pin 26 (Figures 2 and 6). This pin slidingly enters a conforming aperture through a roller 27, pivoted for oscillating movement on one end of an arm or lever 28. The opposite end of the lever is fixed to a block 29 (Figure 6) which is in turn rigidly mounted on the main shaft 15 of the clock mechanism, as is the inner end of spring 14.

It is apparent from the foregoing that as the piston 12 in cylinder 11 is pulled downward by vacuum established in tubes 22 and 21, the torsional exertion on the spring 14 will be effective to rotate the main wheel 16 and consequently taking the place of a mainspring to operate the entire gear train, resulting in the rotation, at a predetermined rate of speed, of the shaft 17.

It is to be understood that as the energy built up in the spring 14 is exhausted, this is restored by an upward and downward movement of the piston 12, which is accomplished with such speed that the interim required therefor is negligible and will have no effect upon the clock mechanism. It is estimated that the piston remains in the downward position approximately two and one-half minutes before the spring 14 is required to be revitalized.

The degree of vacuum in the intake manifold of an engine is known to vary widely and in order that the resultant variable and intermittent force of the piston 12 will be translated into a timed motion of the shaft 17, a hub gear 13ª carried by this shaft is engaged by the teeth of wheel 16 which latter controls the torque of spring 14. An hour wheel 14ª, carried on the center shaft 17 engages a hub gear 15ª on an intermediate shaft 16ª. This latter shaft carries a wheel 17ª which rotates at the controlled speed permitted by the escapement wheel 18ª, escapement lever 19ª, and balance wheel 20ª. The reduction effected through gear 21ª, on the escapement shaft 22ª, gears 17ª and 14ª, limited in their rate of rotation by the balance wheel 20ª, causes shaft 17 to be rotated at the predetermined rate of speed of one revolution per hour. Suitable gearing for operating the counter from this shaft will be presently described. It is here pointed out, however, that any type of escapement mechanism suited for the purpose may be employed to insure against variations in the rotative speed of the clock gear train when the speed of the driving force is varied.

To control the action of the elements set out in the foregoing, a device which will be referred to herein as an interchanger 30 (Figure 9) is provided and adapted to lie flush against the plano surface of the manifold 19. An aperture 31 therein receives the shaft 24 so that it may oscillate. As a means to limit the oscillatory movements of the interchanger 30, a pin 32 is mounted in the face of the manifold 19, against which fingers 33 of the interchanger alternately strike. In the underside of the interchanger, confronting the plano face of the manifold 19, there is provided an arcuate channel or recess 34 which, in one position of the interchanger, joins ports a and b of the manifold 19, while in another position, ports b and c are interconnected. The fact that vacuum is always present in one or the other of the tubes 20 and 21 while the engine is operating, causes the interchanger to cling to the surface of the manifold providing a sufficiently close relationship between these parts.

In opposed relation to the arms 33 on the interchanger, ears 35 are provided and turned outwardly. Contacting alternately with these ears is the downwardly directed lug a' of an arm 36, pivoted at d to the stub shaft 24 of the manifold for limited oscillation with respect to this shaft, which latter, as stated, also oscillates. The shaft 24 has in its end a triangular recess b', conforming with which is a similarly shaped enlargement c' on the arm 36, said enlargement being smaller in width than the recess in order that there will be a slight lost motion as the members oscillate. As a means for controlling the movements of the arm 36, a cam 37 is provided, (omitted in Figure 4 for clarity) shown in Figure 8 in detail. This cam has an opening e therein (Figures 8 and 10) to receive the shaft 24 but is of such diameter as to allow the cam to be displaced with respect to the shaft 24 as the cam is oscillated. Oscillation of shaft 24 a predetermined degree in either direction will oscillate the arm 36 and by virtue of the connection between the arm 36 and the cam, effected by lug a' of the arm the cam also oscillates. When the limit of movement is reached, the spring 38, yieldingly joining the lower portion of the cam to a stationary pin 39 on the frame, propels the cam over dead center to the opposite of two positions, as exemplified in Figure 8, and due to the large central opening e in the cam, the latter has greater freedom of movement than the other elements mounted on shaft 24 and is given impetus by spring 38, which impetus is imparted to the arm 36 to provide snap action and insure rapid movement of the interchanger 39. This action alternates the position of the channel 34 in the interchanger with respect to the manifold ports a, b and c by reason of engagement of lug a' of the arm 36 with one and then the other of the fingers 33 of the interchanger 30.

In operation, the instrument is mounted in a convenient location on the instrument panel of an airplane, or land vehicle, with the tube 22 connected with the air intake of the internal combustion engine. Immediately upon starting the engine, vacuum is set up in this tube and with the interchanger in the position shown in Figures 1 and 4, the tube 22 is in communication with the lower end of cylinder 11 through tube 21. Vacuum thus pulled in the cylinder below the piston 12 will cause the latter to be moved downward, exerting a tortional force on the spring 14, rotating main shaft 17 to actuate the clock mechanism through main wheel 16 thereof. A pawl 40 cooperating with a ratchet 41 (Figure 7) constrains wheel 16 to revolve in one direction only, yet allowing its shaft 15 to oscillate.

As the shaft 15 oscillates, the arm or lever 28 carried thereby is also moved, which in turn, by reason of the sliding connection between the roller 27 and pin 26 (Figure 6), oscillates stub shaft 24. In so moving the stub shaft 24, the arm 36, due to its peculiar connection with this shaft, is similarly moved to propel the cam to the right in Figure 10 as well as interchanger 30. The spring 38 snaps the cam into position and in so doing, the arm 36 is thrust over, carrying with it the interchanger 30 whose channel recess 34 now effects communication between ports b and c. The ports remain in this position for approximately two and one-half minutes or until the energy built up in the spring 14 has been spent. When this occurs, the shaft 15 will have oscillated to such extent as to cause arm 28 (Fig. 6) to move to oscillate stub shaft 24 preparatory to changing the position of the interchanger 30 to the opposite extreme in the same manner as just described. The channel 34 in the interchanger 30 now effects communication between port b and the opposite port a so that vacuum will be established in the top of cylinder 11 through tube 20. Accordingly, the piston snaps upward but due to the pressure of the pawl and ratchet 40 and 41 respectively, wheel 16 is held against rotation. However, the shaft 15 does move to actuate arm 28, oscillating shaft 24 in a direction reverse to that previously described, whereupon the arm 36 will propel cam 37 and consequently the interchanger 30 to a position to again effect communication between tube 22 and the lower end of cylinder 11 by way of ports b and c and tube 21 for repetition of cycles as explained.

It will be understood that the cycles of the piston to restore energy to spring 14 are performed in rapid succession so that the interim is nil. As the shaft 17 is rotated, rotation is imparted to gear 42 which, in turn, rotates gear 43 of the counter 44 (Figure 3). This counter is so constructed as to measure time by the hour and fractions thereof and it is apparent that unauthorized tampering therewith is practically impossible without injury to the parts which would result in instant detection.

Manifestly, the construction as shown and described is capable of some modification and such modification as may be construed to fall within the scope and meaning of the appended claims is also considered to be within the spirit and intent of the invention.

What is claimed is:

1. An instrument for measuring the actual operating periods of an internal combustion engine, including an escapement controlled clock mechanism and a register actuated thereby, a pneumatic piston operating in a cylinder, a spring supplying the force for operating said clock mechanism and whose energy is periodically restored by movements of said piston, a valve mechanism comprised of a manifold body having ports communicating with said cylinder and an interchanger actuated by said clock mechanism for periodically reversing said ports to control the movements of said piston.

2. An apparatus for measuring actual operating periods of internal combustion engines, including an escapement controlled clock mechanism, a pneumatic piston, operating in a cylinder, a spring operatively connecting said piston with said clock mechanism to actuate the same and whose energy is periodically restored by movements of said piston, a valve manifold having ports in communication with the cylinder of said piston, an oscillatable interchanger mounted on said valve manifold and means actuated by said clock mechanism to oscillate said interchanger to effect reversal of said ports whereby to control the movements of said piston.

3. An apparatus for registering the operating periods of internal combustion engines, an escapement controlled clock mechanism, a counter operated thereby, a pneumatic piston operating in a cylinder, a spring whose energy is periodically restored by movements of said piston and adapted to supply the force for operating said clock mechanism, a valve manifold having reversible ports alternately in communication with said cylinder, an interchanger on said manifold and means actuated by said clock mechanism for oscillating said interchanger to effect reversal of said ports whereby to control the movements of said piston.

4. A structure as described in claim 3 in which the means for oscillating the interchanger comprises an arm affixed to an oscillating shaft of the clock mechanism, a second arm having pivotal and sliding relation with said first arm, a shaft actuated by said second arm, a snap action cam, a cam arm mounted on and operated by said shaft and having periodic engagement with said interchanger to actuate the same.

5. A structure as described in claim 3 in which the valve manifold and interchanger comprise respectively a centrally apertured body having a plurality of passages having outlets, pairs of the latter being adapted to be alternately brought into communication and an oscillatable member adapted to overlie at least two of said outlets at each extreme position thereof to effect said communication.

WILLIAM R. REYNOLDS.